US012270727B2

(12) United States Patent
Zhang et al.

(10) Patent No.: US 12,270,727 B2
(45) Date of Patent: Apr. 8, 2025

(54) UNDERWATER DETECTION METHOD AND SYSTEM FOR CONTACT LEAKAGE OF TUNNEL JOINTS OF DAM CULVERT

(71) Applicant: Nanjing Hydraulic Research Institute, Nanjing (CN)

(72) Inventors: Kai Zhang, Nanjing (CN); Jinbao Sheng, Nanjing (CN); Yan Xiang, Nanjing (CN); Chengdong Liu, Nanjing (CN); Fudong Chi, Nanjing (CN); Hao Chen, Nanjing (CN); Zhuo Li, Nanjing (CN); Bingbing Nie, Nanjing (CN); Bo Dai, Nanjing (CN); Yakun Wang, Nanjing (CN)

(73) Assignee: Nanjing Hydraulic Research Institute, Nanjing (CN)

( * ) Notice: Subject to any disclaimer, the term of this patent is extended or adjusted under 35 U.S.C. 154(b) by 0 days.

(21) Appl. No.: 18/919,977

(22) Filed: Oct. 18, 2024

(65) Prior Publication Data
US 2025/0044175 A1    Feb. 6, 2025

(30) Foreign Application Priority Data

May 23, 2024 (CN) ............ 202410643518.0

(51) Int. Cl.
G01M 3/04         (2006.01)
(52) U.S. Cl.
CPC ..................... G01M 3/04 (2013.01)
(58) Field of Classification Search
CPC ...................................... G01M 3/04
See application file for complete search history.

(56) References Cited

U.S. PATENT DOCUMENTS 3,633,667 A * 1/1972 Falkner, Jr. ........... E21B 43/017
166/365
9,177,363 B1 * 11/2015 Huang ..................... G06T 5/00
(Continued)

FOREIGN PATENT DOCUMENTS

| CN | 104749655 A | 7/2015 |
| CN | 111754475 A | 10/2020 |
| CN | 116416270 A | 7/2023 |

OTHER PUBLICATIONS

CNIPA Office Action, Application No. 202410643518.0; Transmitted Jul. 1, 2024; Chinese Original, pp. 1-4.
(Continued)

Primary Examiner — Santiago Garcia
(74) Attorney, Agent, or Firm — Addison D. Ault; IPGentleman Intellectual Property Services, LLC

(57) ABSTRACT

The present disclosure provides an underwater detection method for contact leakage of a tunnel joint of a dam culvert, including: obtaining an underwater image sequence of the culvert by an underwater robot; preprocessing and registering the underwater image sequence; extracting particle information appearing in the underwater image sequence based on the registered underwater image sequence; constructing a three-dimensional fluid velocity distribution map based on the particle information, and determining leakage situation according to the three-dimensional fluid velocity distribution map; and superimposing the three-dimensional fluid velocity distribution map on a preconfigured three-dimensional culvert model, and rendering and displaying it. The present disclosure can adapt to the complex and changeable underwater environment inside the culvert, it has a high sensitivity to fine leakage in the deep layer, it can realize the (Continued)

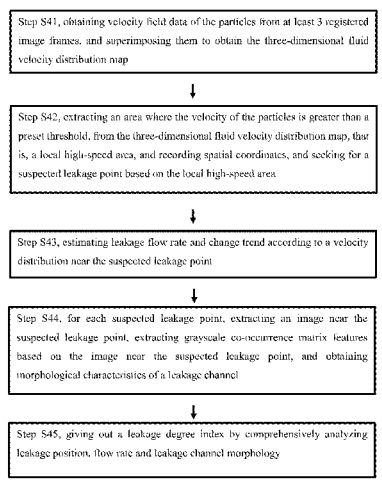

accurate measurement and trend prediction of leakage, and it can automate the detection process to reduce manual dependence.

7 Claims, 6 Drawing Sheets

(56) References Cited

U.S. PATENT DOCUMENTS

| | | | | |
|---|---|---|---|---|
| 2002/0024594 A1* | 2/2002 | Yamamuro | ............ | H04N 7/185 348/81 |
| 2011/0192338 A1* | 8/2011 | Goudeau | ................ | B63B 27/16 114/322 |
| 2011/0268509 A1* | 11/2011 | Thuet | ................... | B63B 21/502 405/224 |
| 2014/0343728 A1* | 11/2014 | Jun | ....................... | B63H 19/08 901/1 |
| 2016/0223354 A1* | 8/2016 | Driscoll | ................ | H04N 23/90 |
| 2017/0122484 A1* | 5/2017 | Maimets | ................... | E03F 7/00 |
| 2020/0310471 A1* | 10/2020 | Hogg | ..................... | A61B 5/065 |
| 2021/0129960 A1* | 5/2021 | Du | ........................ | B63G 8/001 |
| 2021/0237838 A1* | 8/2021 | Grall | ....................... | B63B 27/36 |
| 2022/0144172 A1* | 5/2022 | Fukuma | ................. | G06F 3/013 |
| 2023/0103110 A1* | 3/2023 | Liu | ........................ | B63G 8/001 114/312 |

OTHER PUBLICATIONS

CNIPA Office Action, Application No. 202410643518.0; Transmitted Jul. 1, 2024; English Machine Translation, accessed Oct. 16, 2024, pp. 1-5.

CN104749655A to Changjiang Survey, Planning, Design and Research Co., Ltd.; issued Jul. 1, 2015 English Machine Translation accessed Oct. 16, 2024, pp. 1-5.

\* cited by examiner

Step S1, obtaining an underwater image sequence of the culvert by an underwater robot

↓

Step S2, preprocessing and registering the underwater image sequence

↓

Step S3, extracting particle information appearing in the underwater image sequence based on the registered underwater image sequence

↓

Step S4, constructing a three-dimensional fluid velocity distribution map based on the particle information, and determining leakage situation according to the three-dimensional fluid velocity distribution map

FIG. 1

Step S11, setting a movement trajectory of the underwater robot and moving the underwater robot to the culvert

Step S12, configuring the camera provided on the underwater robot to shoot images at a predetermined rate, frame rate and resolution to obtain image frames, wherein a movement velocity matches with a shooting frame rate so that there is more than 30% overlap between adjacent frames

Step S13, transmitting the collected image frames together with position and posture data of the underwater robot to a control system

FIG. 2

Step S21, sequentially obtaining the image frames, adopting a distortion correction model to correct radial distortion and tangential distortion, and obtaining corrected image frames

Step S22, performing a local mean filtering on the corrected image frames to obtain filtered image frames

Step S23, performing a logarithmic transformation on the filtered image frames to obtain transformed image frames

Step S24, adopting ORB feature extraction and RANSAC algorithm to estimate a homography transformation matrix of two transformed image frames, and performing image registration based on the homography transformation matrix to obtain registered image frames, wherein the registered image frames form a registered image sequence

FIG. 3

Step S31, obtaining a registered image sequence, reading registered image frames one by one, identifying particle clusters of similar size and shape from the registered image frames as particles for velocity measurement

↓

Step S32, calculating an instantaneous velocity vector of each particle based on a mass center displacement of the particle between the registered image frames and a shooting interval of a camera

↓

Step S33, dividing the registered image frames into a predetermined number of grids, and counting mean and variance of the velocity vectors of the particles in each grid

↓

Step S34, adopting a fluid mechanics inversion algorithm, and considering particle characteristics and turbulent pulsation effects to correct velocity fields of the particles

↓

Step S35, retrieving internal and external parameters of the camera, converting the velocity fields of the particles from a pixel coordinate system to a world coordinate system, and obtaining the velocity fields of the particles in the world coordinate system

FIG. 4

Step S41, obtaining velocity field data of the particles from at least 3 registered image frames, and superimposing them to obtain the three-dimensional fluid velocity distribution map

Step S42, extracting an area where the velocity of the particles is greater than a preset threshold, from the three-dimensional fluid velocity distribution map, that is, a local high-speed area, and recording spatial coordinates, and seeking for a suspected leakage point based on the local high-speed area

Step S43, estimating leakage flow rate and change trend according to a velocity distribution near the suspected leakage point

Step S44, for each suspected leakage point, extracting an image near the suspected leakage point, extracting grayscale co-occurrence matrix features based on the image near the suspected leakage point, and obtaining morphological characteristics of a leakage channel

Step S45, giving out a leakage degree index by comprehensively analyzing leakage position, flow rate and leakage channel morphology

FIG. 5

Step S51, calling a preconfigured three-dimensional culvert model

Step S52, superimposing the three-dimensional fluid velocity distribution map and the leakage degree index on the three-dimensional culvert model, coloring the leakage points according to a hazard level, and superimposing a local particle velocity flow field to generate a three-dimensional leakage distribution heat map Step S53, extracting key leakage parameters, including position coordinates, leakage flow rate, change trend and hazard level, filling them in a preset report template, and forming a leakage detection report

FIG. 6

UNDERWATER DETECTION METHOD AND SYSTEM FOR CONTACT LEAKAGE OF TUNNEL JOINTS OF DAM CULVERT

CROSS-REFERENCE TO RELATED APPLICATION

This application claims priority to Chinese Patent Application No. 202410643518.0, filed on May 23, 2024 before the China National Intellectual Property Administration, the disclosure of which is incorporated herein by reference in entirety.

TECHNICAL FIELD

The present disclosure relates to the field of underwater detection, and in particular to an underwater detection method and system for contact leakage of a tunnel joint of a dam culvert.

BACKGROUND

Dam safety is very important, and engineers have proposed many detection methods for this purpose.

The current leakage detection method of dam culverts mainly includes: I, visual inspection: this method is inefficient, easy to miss leakage points, and powerless for leakage in deep water areas. II, flow meter method: this method can only measure the total leakage, but it is difficult to locate local leakage points. III: acoustic detection method: this method is easily disturbed by environmental noise and has low positioning accuracy. IV: Infrared imaging method: this method is sensitive to surface leakage but difficult to detect deep leakage. V. Electromagnetic method: this method has bulky equipment, difficult on-site deployment, and limited resolution. In short, there are still many technical problems that need to be solved in the existing technology, including difficulty in accurately locating small local leakage in the deep layer; great restriction by the detection environment and poor applicability; lack of quantitative analysis and trend prediction capabilities; low automation and intelligence, and relying on manual interpretation.

In recent years, underwater robot technology has developed rapidly, providing a new means for internal detection of culverts. However, in complex water flow environments such as turbulence, it is difficult for the optical camera carried by the robot to capture the real leakage state.

In summary, it is urgent to develop a new underwater leakage detection method for culverts that can eliminate water flow interference and achieve high-precision positioning and quantitative analysis.

SUMMARY

The objective of the present disclosure is to provide an underwater detection method and system for contact leakage of a tunnel joint of a dam culvert to solve the above-mentioned problems existing in the prior art.

Technical solutions of the present disclosure includes: an underwater detection method for contact leakage of a tunnel joint of a dam culvert, comprising:
Step S1, obtaining an underwater image sequence of the culvert by an underwater robot;
Step S2, preprocessing and registering the underwater image sequence;
Step S3, extracting particle information appearing in the underwater image sequence based on the registered underwater image sequence;
Step S4, constructing a three-dimensional fluid velocity distribution map based on the particle information, and determining leakage situation according to the three-dimensional fluid velocity distribution map; and
Step S5, superimposing the three-dimensional fluid velocity distribution map on a preconfigured three-dimensional culvert model, and rendering and displaying it.

According to another aspect of the present disclosure, there is provided an underwater detection system for contact leakage of a tunnel joint of a dam culvert, comprising:
at least one processor; and
a memory connected to the at least one processor in communication,
wherein the memory stores instructions executable by the processor, and the instructions are intended to be executed by the processor to implement the underwater detection method according to any one of the above embodiments.

Beneficial effect: the present disclosure adopts an underwater robot to obtain image data, it can conduct long-term, dynamic cruise monitoring of the dam body without interfering with the normal operation of the culvert, greatly improving detection efficiency and safety. Through machine vision and artificial intelligence technology, automatic identification and alarm of leakage hazards can be achieved, reducing manpower investment and subjective judgment errors. The relevant technical effects will be described in detail below.

BRIEF DESCRIPTION OF THE DRAWINGS

FIG. 1 is a flow chart of an underwater detection method for contact leakage of a tunnel joint of a dam culvert according to an embodiment of the present disclosure.

FIG. 2 is a flow chart of step S1 of the underwater detection method according to an embodiment of the present disclosure.

FIG. 3 is a flow chart of step S2 of the underwater detection method according to an embodiment of the present disclosure.

FIG. 4 is a flow chart of step S3 of the underwater detection method according to an embodiment of the present disclosure.

FIG. 5 is a flow chart of step S4 of the underwater detection method according to an embodiment of the present disclosure.

FIG. 6 is a flow chart of step S5 of the underwater detection method according to an embodiment of the present disclosure.

DETAILED DESCRIPTION OF EMBODIMENTS

As shown in FIG. 1, according to one aspect of the present disclosure, an underwater detection method for contact leakage of a tunnel joint of a dam culvert includes the following steps:
Step S1, obtaining an underwater image sequence of the culvert by an underwater robot; Step S2, preprocessing and registering the underwater image sequence;
Step S3, extracting particle information appearing in the underwater image sequence based on the registered underwater image sequence; Step S4, constructing a three-dimensional fluid velocity distribution map based on the particle information, and determining leakage situation according to the three-dimensional fluid velocity distribution map; and Step S5, superimposing the three-dimensional fluid velocity distribution map on a preconfigured three-dimensional culvert model, and rendering and displaying it.

In this embodiment, a series of image preprocessing and registration (georeferencing/calibration) measures are adopted, they include distortion correction, filter enhancement, histogram equalization, etc., which effectively improve the image quality. The image registration is realized by using ORB feature point matching and RANSAC algorithm, it can eliminate the image jitter and offset caused by the robot movement. Even in a complex and changeable underwater environment, it can accurately capture the dynamic texture changes caused by leakage, and have strong environmental adaptability. A flow field analysis method based on particle image velocimetry (PIV) is introduced. By tracking the movement of particles in the dynamic textures, the local velocity field can be accurately reconstructed. Combining fluid mechanics inversion and turbulent pulsation correction, a true and reliable three-dimensional velocity distribution is obtained. On this basis, the high-speed area and velocity gradient are extracted, and a reasonable threshold is set in consideration of the physical mechanism of leakage to locate the suspected leakage point. Further analysis of the velocity, flow rate, morphological characteristics, etc. of the leakage point can quantitatively evaluate the severity of the leakage. This method directly establishes the correspondence between image information and leakage (seepage) physical quantities, it is more accurate and reliable than pure visual analysis. Combining three-dimensional point cloud data with existing BIM models, three-dimensional visualization of the leakage scene is realized. By mapping the velocity field into the BIM model and performing pseudo-color rendering, the leakage distribution state of the entire culvert can be intuitively presented. The integration of quantitative physical parameters with qualitative visual information can achieve a comprehensive control of the overall and detailed leakage information, providing a richer and more accurate basis for risk assessment and maintenance decisions.

As shown in FIG. 2, according to one aspect of the present disclosure, the step S1 includes:

Step S11, setting a movement trajectory of the underwater robot and moving the underwater robot to the culvert;

Step S12, configuring the camera provided on the underwater robot to shoot images at a predetermined rate, frame rate and resolution to obtain image frames, wherein a movement velocity matches with a shooting frame rate so that there is more than 30% overlap between adjacent frames;

Step S13, transmitting the collected image frames together with position and posture data of the underwater robot to a control system.

In one embodiment, the underwater robot carries a high-speed high-definition camera and cruises along a preset trajectory inside the culvert; the camera continuously shoots 1920×1080 resolution color images at a rate of 60 frames/second; the robot movement speed is controlled to match the shooting frame rate to ensure that there is 30% to 50% overlap between adjacent frames; the collected images together with metadata such as position and posture are transmitted to the shore-based control center in real time.

Multi-source sensors such as sonar, inertial navigation, and optics can be integrated on the robot to achieve autonomous positioning, obstacle avoidance, and trajectory tracking control. Even under complex terrain conditions and external interference, the robot can accurately execute the planned route. Autonomous navigation frees the robot from dependence on manual remote control, greatly improving work efficiency and reducing the safety risk of personnel entering the culvert. High-resolution imaging allows small leakage traces and detailed textures to be clearly imaged, facilitating early detection of leakage. At the same time, in low-light environments, the camera parameters can be adaptively adjusted to maintain appropriate brightness and contrast of the images, overcoming the problem of degraded image quality caused by insufficient light. By using the hardware trigger mechanism of the visual sensor, the status data can be timestamped while the image is being acquired, and the image and status data are configured to be in one-to-one correspondence to achieve the spatiotemporal synchronization of multi-source heterogeneous sensor data. After the synchronized data is transmitted back to the ground control system, the image frame sequence can be linked to the three-dimensional space of the culvert according to the real-time position and posture of the robot. Through the complementary fusion of visual measurement and inertial measurement, a high-precision estimation of the image shooting position can be achieved, thereby determining the accurate spatial coordinates of the leakage, which is convenient for subsequent positioning and analysis.

As shown in FIG. 3, the step S2 includes:

Step S21, sequentially obtaining the image frames, adopting a distortion correction model to correct radial distortion and tangential distortion, and obtaining corrected image frames;

Step S22, performing a local mean filtering on the corrected image frames to obtain filtered image frames;

Step S23, performing a logarithmic transformation on the filtered image frames to obtain transformed image frames;

Step S24, adopting ORB feature extraction and RANSAC algorithm to estimate a homography transformation matrix of two transformed image frames, and performing image registration based on the homography transformation matrix to obtain registered image frames, wherein the registered image frames form a registered image sequence.

In this embodiment, affected by the manufacturing process and the characteristics of the optical lens, the original image captured by the robot camera often has radial distortion (barrel/pincushion distortion) and tangential distortion. If no correction is made, the image point position will be offset, affecting the subsequent image stitching, geometric measurement and motion estimation accuracy. This step uses the widely used Brown-Conrady model to explicitly model the radial distortion and tangential distortion, and obtains the distortion coefficient through the camera calibration process. Substituting the original image coordinates into the model can calculate the distortion-free image coordinates and complete the image correction. After distortion correction, the image points and space points meet a strict linear projection relationship, and the measurement accuracy is significantly improved. Due to the poor lighting conditions in the underwater environment, the imaging signal-to-noise ratio is generally low, and the image quality is greatly affected by random noise. This step uses a local mean filter to smooth the image, which can effectively remove high-frequency noise and better protect texture details such as edges. It is worth mentioning that this scheme adopts an adaptive window size control strategy. That is, the filter window size is dynamically adjusted according to the grayscale variance of the local area of the image, a larger window is selected in the flat area to obtain a stronger smoothing effect, and a smaller window is selected in the edge area to reduce edge blur.

Adaptive filtering maximizes the retention of texture features of leakage signs while denoising.

Affected by light scattering and absorption, underwater images generally have problems of low contrast and uneven brightness, and the histogram is mainly concentrated in the low grayscale area. Logarithmic transformation can map the narrow low gray value range to a wide dynamic range by taking the logarithm of the gray value, thereby stretching the image histogram and enhancing the dark details. Especially for textures with weak contrast in leakage areas, the visual quality and discernibility are greatly improved after logarithmic transformation. It is worth noting that the effect of logarithmic transformation depends on the selection of the base, so this scheme adaptively determines the optimal base according to the average brightness of the image, avoiding the loss of details caused by excessive enhancement while improving the contrast.

Due to the changes in the robot's posture and distance to the target scene during underwater movement, there are differences in scale, rotation and perspective between the continuously collected image frames. In order to accurately analyze the texture changes in the same area, registration correction must be performed. ORB features combine the advantages of FAST key points and BRIEF descriptors, have good invariance to image rotation and scale transformation, and have high computational efficiency, therefore it is very suitable for real-time image registration tasks. Based on ORB matching point pairs, the RANSAC algorithm can be used to robustly estimate the homography matrix of image transformation and eliminate the interference of incorrect matching points. Applying the estimated homography matrix to the image coordinates can unify images of different perspectives into a common coordinate framework, preparing for image stitching and motion analysis.

In this embodiment, the original image is assumed to be I(x, y), and the Brown-Conrady distortion model is adopted. The ideal coordinates (x', y') of the pixel coordinates (x, y) after distortion correction satisfy:

$$x'=x(1+k_1 r^2+k_2 r^4+k_3 r^6)+[p1(r^2+2x^2)+2p2xy][1+p3r^2+\ldots];$$

$$y'=y(1+k_1 r^2+k_2 r^4+k_3 r^6)+[p2(r^2+2y^2)+2p1xy][1+p3r^2+\ldots];$$

where $r=\sqrt{x^2+y^2}$, $k_1$, $k_2$, $k_3$ are radial distortion coefficients, and $p_1$, $p_2$, $p_3$ are tangential distortion coefficients. Calibrate the camera to get the distortion coefficients, and substitute them into the formulas to complete the image correction. Let the corrected image be $I'_{(x, y)}$, and its non-local mean filter output image is $I''(x, y)=(1/C(x, y))*sum_{(a, b)} w_{(x, y, a, b)} * I'_{(a, b)}$; where (a, b) is neighborhood pixel coordinates of $I'_{(x, y)}$, $w_{(x, y, a, b)}$ is a similarity weight between (x, y) and (a, b): $w_{(x, y, a, b)} = \exp(-\|I'(N_x, N_y) - I'(N_a, N_b)\|^2/h^2)$; $N_x$, $N_y$ and $N_a$, $N_b$ are local neighborhood windows of (x, y) and (a, b) respectively, and h is a smoothing parameter. C(x, y) is a normalization coefficient.

Suppose the filtered image is I''(x, y), and the logarithmic transformation output image is I'''(x, y)=c*log (1+I''(x, y)); where c is a scale factor, which controls the contrast of the transformed image. Using ORB feature extraction and RANSAC algorithm, estimate the homography transformation matrix H of the two frames of images $I_1'''$ and $I_2'''$: $[x_2, y_2, 1]'=H*[x_1, y_1, 1]'$; use H to complete image registration and correct the position deviation caused by camera motion.

Specifically, using ORB feature extraction and RANSAC algorithm, estimate the homography transformation matrix H of the two frames of images $I_1'''$ and $I_2'''$. The specific process is:

Input: two frames of images I1''' and I2'''
Extract ORB Features

Perform ORB feature extraction on I1''' and I2''' respectively. ORB (Oriented FAST and Rotated BRIEF) is an algorithm that combines FAST feature point detection and BRIEF feature description.

FAST feature point detection. Convert image I to grayscale image and select a suitable threshold T. For each pixel p, examine the 16 pixels with a radius of 3 around it. If the grayscale values of N consecutive pixels are greater than the grayscale value of p+T or less than the grayscale value of p−T, then p is considered to be a feature point. Usually N=12, T=20.

Feature point direction estimation. For each detected feature point p, calculate the grayscale centroid C in its neighborhood (for example, 15*15 window). The direction θ of the vector p→C is taken as the main direction of the feature point.

Generate BRIEF descriptor. Take the neighborhood window of SS (for example, 3131) with the feature point p as the center, and randomly select M pairs of pixels in it. For each pair of pixels (xi, yi), compare the size of their grayscale values. If I(xi)<I(yi), the i-th descriptor is 1, otherwise it is 0. Finally, an M-bit binary string is obtained as the BRIEF descriptor of p.

According to the main direction θ of the feature point, the BRIEF descriptor is rotated using the rotation matrix $R=[\cos^\theta - \sin^\theta; \sin^\theta \cos^\theta]$ to obtain a descriptor with rotation invariance, called RotatedBRIEF.

Repeat the above steps for I1''' and I2''' to obtain the ORB feature point sets F1 and F2 of the two frames of images, and the corresponding descriptor sets D1 and D2.

Feature Point Matching:

For each feature point pi in F1, process all feature points {qj} in F2, and calculate the Hamming distance H (dpi, dqj) between the descriptor dpi of pi and the descriptor dqj of each qj, that is, the number of different corresponding positions in the two equal-length binary strings.

Select the qj with the smallest Hamming distance as the potential matching point of pi, denoted as qmin. The second smallest is denoted as qmin2.

If H (dpi, dqmin)/H (dpi, dqmin2)<$\alpha$, then pi and qmin are confirmed to be a pair of matching points, otherwise it is considered that it has not found a match for pi. $\alpha$ is an empirical threshold, usually 0.8.

Process all pi to obtain an initial feature point matching set P0.

Use RANSAC to estimate the homography matrix:

Randomly extract 4 pairs of matching points from P0 (a total of 8 points' coordinates) and calculate the perspective transformation matrix H0 between them. This is because the perspective transformation has 8 degrees of freedom and requires 4 pairs of points to determine.

S32. Using H0, for each pair of matching points (pi, qi) in P0, calculate the transformation error:

$$ei=\|qi-H0*pi\|^2;$$

where pi and qi are both homogeneous coordinates.

Set the error threshold ε, and count the number of matching point pairs n0 where ei<ε as the number of supporting inner points (inliers) of H0.

Repeat K times, randomly select 4 different matching points each time, and obtain K homography matrices H1, H2, . . . , HK and the corresponding number of inliers n1, n2, . . . , nK. The size of K is estimated according to the inlier rate w:

$$K=\log(1-p)/\log[1-(1-w)+];$$

where p is the expected probability of success of the algorithm, generally p=0.99.

Select the homography matrix Hbest with the largest number of inliers, and further optimize the homography matrix based on its inlier set Pbest. Use the Levenberg-Marquardt algorithm to minimize the reprojection error: $minsumi\|qi-H*pi\|^2$;

H is the final homography matrix after optimization.

Output the homography transformation matrix H between the images I1''' and I2'''.

It has the following advantages: ORB features combine the advantages of the FAST and BRIEF algorithms, take into account speed and rotation invariance, and have good adaptability to changes in illumination and perspective. RANSAC is a robust estimation method that can effectively eliminate the interference of mismatching and obtain a reliable transformation model.

As shown in FIG. 4, the step S3 includes:

Step S31, obtaining a registered image sequence, reading registered image frames one by one, identifying particle clusters of similar size and shape from the registered image frames as particles for velocity measurement;

Step S32, calculating an instantaneous velocity vector of each particle based on a mass center displacement of the particle between the registered image frames and a shooting interval of a camera;

Step S33, dividing the registered image frames into a predetermined number of grids, and counting mean and variance of the velocity vectors of the particles in each grid;

Step S34, adopting a fluid mechanics inversion algorithm, and considering particle characteristics and turbulent pulsation effects to correct velocity fields of the particles; and Step S35, retrieving internal and external parameters of the camera, converting the velocity fields of the particles from a pixel coordinate system to a world coordinate system, and obtaining the velocity fields of the particles in the world coordinate system.

In this embodiment, due to the widespread existence of interference factors such as sediment and bubbles in the water body, accurate identification of velocity tracer particles is the key to PIV velocity measurement. In this embodiment, this step proposes a particle clustering method based on shape and scale similarity. First, the suspected particle area is extracted by image threshold segmentation, and then adaptive filtering is performed by analyzing the shape characteristics of the connected domain (such as area, perimeter, roundness, etc.), and finally the particles with similar shapes and sizes are classified into a cluster. This method can effectively remove background noise and isolated noise (miscellaneous point), obtain reliable velocity tracer particles, and provide high-quality input for velocity field estimation.

Particle displacement is the direct basis for velocity calculation, and its estimation accuracy largely determines the reliability of velocity measurement results. This step uses the local maximum grayscale weighted method to calculate center of mass coordinates of the particle, and uses the center of mass position as a measure of particle displacement. Combined with the camera shooting interval, the instantaneous velocity vector can be estimated. Compared with the commonly used whole pixel matching method, sub-pixel positioning makes displacement estimation no longer limited by pixel size, greatly improving the velocity resolution capability. Even for slowly moving leakage areas, displacement changes at the sub-pixel level can be detected, realizing early detection of small leakage.

Dividing the image into several non-overlapping grid areas can discretize the scattered particle velocity into a regular vector field. However, the selection of grid size requires a trade-off between resolution and robustness. This scheme proposes an adaptive grid division method based on velocity gradient. That is, the grid size is dynamically adjusted according to the local rate of change of velocity within the grid. In areas with large velocity gradients (such as shear layers and vortex cores), dense small grids are used to ensure high-resolution representation; in areas with small velocity gradients, sparse large grids are used to improve robustness. This adaptive multi-scale analysis method can capture the fine structure of leakage (seepage) without increasing the computational burden.

The velocity correction method based on fluid mechanics inversion can eliminate the influence of turbulent pulsation to a certain extent. By introducing Reynolds decomposition, the instantaneous velocity is regarded as the superposition of the average velocity and the pulsating velocity. On the basis of estimating the average velocity field, the continuity equation and momentum conservation equation are used to correct the pulsating component to meet the basic constraints of fluid mechanics. At the same time, the inertial effect and tracking characteristics of the tracer particles are also considered, which further improves the physical rationality of the velocity estimation. The velocity field after turbulence correction is smoother and continuous, and the detailed structure is clearer, providing a reliable quantitative basis for leakage analysis.

By performing an offline calibration on the underwater robot camera, the mapping relationship between the pixel coordinate system and the world coordinate system can be accurately established. Substituting the estimated particle displacement on the two-dimensional image plane into the camera model, the spatial displacement vector can be solved by combining the depth information, and then the spatial velocity vector can be obtained. This three-dimensional reconstruction method based on imaging geometry overcomes the limitation of traditional two-dimensional PIV that it is difficult to characterize the spatial flow field, and truly reproduces the three-dimensional flow field of the leakage. The velocity description based on physical scale is also easier for engineers to understand and apply.

In this embodiment, Gaussian mixture background modeling is applied to the registered image sequence $I_t'''$ (t=1, 2, . . . ) to extract the foreground motion region $R_t$: $R_t(x, y)=1$, when $I_t'''(x, y)-sum_{i=1}^{K} omega_i * eta(I_t'''(x, y)|mu_i, sigma_i^2) > tau$;

Otherwise $R_t(x, y)=0$, where $omega_i$, $mu_i$, $sigma_i^2$ are the weight, mean and variance of the i-th Gaussian component, eta is the Gaussian probability density function, and tau is the foreground judgment threshold. Connected domain analysis and morphological filtering are performed on $R_t$ to obtain the candidate particle region $P_t^i$.

Assuming that the center of mass coordinates of the i-th particle in the t-th frame and the t+1-th frame are $(x_t^i, y_t^i)$ and $(x_{t+1}^i, y_{t+1}^i)$, its instantaneous displacement velocity is: $v_t^i=[(x_{t+1}^i-x_t^i)/delta_t, (y_{t+1}^i-y_t^i)/delta_t]$; where $delta_t$ is the frame interval.

Considering the velocity pulsation caused by turbulence, the Kalman filter model is introduced to smooth the velocity estimation:

$$v_t^i = A * v_{t-1}^i + + w_t; z_t^i = H * v_t^i + e_t;$$

where A is the state transfer matrix, H is the observation matrix, $w_t$ and $e_t$ are process noise and observation noise respectively.

The entire image is divided into M*N grids, and the velocity vectors of all particles in the (m, n)th grid $G_{mn}$ are averaged to obtain the grid velocity: $V_{mn} = 1/K_{mn} * \text{sum}_{iinGmn} v_t^i$; where $K_{mn}$ is the number of particles in the grid.

The Fincham-Spedding method is used to correct the grid velocity field $V_{mn}$ by combining the continuity equation and the Navier-Stokes equation: $nabla^2 \ psi = -nabla \times V_{mn}$; $V'_{mn} = V_{mn} + nabla \times psi$;

where psi is the potential function and nabla is the gradient operator. Solve the Poisson equation to obtain the corrected velocity field $V'_{mn}$.

Assume that the camera's intrinsic parameter matrix is K and the extrinsic parameter matrix is [R|t], then the transformation relationship from the pixel coordinate system to the real world coordinate system is: $s [u, v, 1]' = K * [R|t] * [X, Y, Z, 1]'$; where s is the scale factor and [X, Y, Z] is the real world coordinate. Perform coordinate transformation on the velocity vector $V'_{mn}$ of each grid to obtain a three-dimensional velocity field with the culvert as the reference system.

As shown in FIG. 5, the step S4 includes:

Step S41, obtaining velocity field data of the particles from at least 3 registered image frames, and superimposing them to obtain the three-dimensional fluid velocity distribution map;

Step S42, extracting an area where the velocity of the particles is greater than a preset threshold, from the three-dimensional fluid velocity distribution map, that is, a local high-speed area, and recording spatial coordinates, and seeking for a suspected leakage point based on the local high-speed area;

Step S43, estimating leakage flow rate and change trend according to a velocity distribution near the suspected leakage point;

Step S44, for each suspected leakage point, extracting an image near the suspected leakage point, extracting grayscale co-occurrence matrix features based on the image near the suspected leakage point, and obtaining morphological characteristics of a leakage channel; and Step S45, giving out a leakage degree index by comprehensively analyzing leakage position, flow rate and leakage channel morphology.

In this embodiment, since the occurrence and development of leakage is a dynamic process, the velocity measurement result at a single moment is often insufficient to fully describe the spatiotemporal evolution law of leakage. This step uses the three-dimensional Lagrangian particle tracking algorithm to spatially combine the velocity vector fields at different times to form a dynamic flow field that is continuous in time and coherent in space. The three-dimensional velocity distribution diagram intuitively shows the spatial morphology and temporal variation trend of the leakage, providing rich data support for the precise positioning and trend prediction of the leakage. The spatiotemporal distribution of velocity also reflects the structural characteristics of the infiltration channel from the perspective of fluid mechanics, and is an important basis for the analysis of the cause of leakage and the study of its mechanism.

Unlike the empirical threshold method, this step adaptively determines the segmentation threshold based on the velocity statistical histogram. First, the three-dimensional velocity amplitude is histogram-statisticed, and then the optimal segmentation threshold of the bimodal histogram is solved through iterative optimization to maximize the inter-class variance on both sides of the threshold. The adaptive threshold can effectively cope with the changes in the velocity distribution pattern under different leakage conditions, greatly improving the adaptability and robustness of leakage positioning. On this basis, the high-speed noise area is further eliminated by morphological filtering, and the spatial coordinates of the suspected leakage area are extracted by connected domain analysis. Since the high-speed area is highly correlated with the leakage point in space, the positioning result can provide a reliable initial position for subsequent leakage quantitative analysis.

By interpolating and reconstructing the velocity field in the neighborhood of the suspected leakage point, a fine local flow field model is obtained. On this basis, the continuity equation and momentum conservation equation in fluid mechanics are used to estimate the velocity distribution of the leakage section, and the leakage volume flow is calculated by numerical integration. Compared with the simple control volume method, this method makes full use of the spatial correlation of the neighborhood velocity, considers the continuity and smoothness of the flow field, and the estimation result is more accurate and reliable. By analyzing the trend of leakage flow at different times, the medium-term and long-term prediction of the leakage development trend can also be achieved, providing a quantitative basis for flood risk assessment and scheduling decisions.

GLCM can effectively reflect the roughness, regularity, contrast and other characteristics of the texture by statistically analyzing the grayscale co-occurrence probability of the image in a certain direction and distance. The type of leakage channel can be identified by pattern matching of the GLCM features of the leakage area with the feature templates of common leakage channels (such as cracks, caves, joints, etc.). Further combined with the morphological parameters of the leakage channels (such as length, width, tortuosity, etc.), the fine three-dimensional reconstruction of the leakage channels can be achieved. The geometric structure information of the leakage (infiltration) channel is closely related to the cause mechanism of leakage and is the key basis for conducting leakage path analysis and leakage stability evaluation.

Taking into account multiple key factors such as the spatial location of the leakage, leakage flow rate, change trend, and characteristics of the leakage channel, a comprehensive evaluation index including leakage detection rate, leakage index, and risk level is constructed. The weight of each evaluation index is determined by the hierarchical analysis method, and the quantitative score of the leakage degree is obtained by weighted fusion (combination). On this basis, the leakage degree is graded (such as mild, moderate, severe, etc.) in combination with the empirical threshold to intuitively characterize the harmfulness of the leakage. The quantitative leakage degree index directly depicts the safety hazards of the leakage from the perspective of engineering risk, which is convenient for management personnel to quickly judge the severity of the leakage problem and take targeted prevention and control measures in time.

In this embodiment, the continuous K-frame velocity field is spliced in time series to construct a four-dimensional space-time velocity field V (X, Y, Z, t). The velocity threshold $V_{th}$ is set, and the area satisfying $|V(X, Y, Z, t)|>V_{th}$ is extracted as the suspected leakage area R (X, Y, Z). Perform three-dimensional morphological filtering on R to obtain the leakage area L. Assuming that the velocity field in the leakage area L obeys the Poiseuille distribution, the local leakage flow Q can be approximated as: $Q=A*V_c*(2/\text{pi})^{1/2}*\exp(-V_c^2/2\text{sigma}^2)$;

where A is the cross-sectional area of the leakage area, $V_c$ is the characteristic flow velocity, and sigma is the turbulent pulsation intensity, which can be estimated based on the statistical characteristics of the velocity in L. The local leakage flow is accumulated to obtain the total leakage amount.

Extract the gray level co-occurrence matrix (GLCM) features from the image near the suspected leakage area L:

$$p(i,j,d,\text{theta})=\#[(x_1,y_1),(x_2,y_2)], I(x_1,y_1)=i, I(x_2,y_2)=j, \text{sqrt}((x_1-x_2)^2+(y_1-y_2)^2)=d, \arctg((y_1-y_2)/(x_1-x_2))=\text{theta} \#R;$$

where I is the gray image and # is the counting operator. Calculate the texture indicators such as contrast, correlation, and energy from the co-occurrence matrix to form a feature vector. Input the texture features of each leakage area into the pre-trained SVM classifier to identify the leakage channel morphology.

Construct a leakage risk assessment model, the input parameters include: leakage location, leakage flow, leakage channel geometry, leakage flow change trend, etc. The model adopts fuzzy comprehensive evaluation method, maps each input index to the interval [0, 1] through the membership function, and establishes the fuzzy evaluation matrix R:

$R=[r_{11}, r_{12}, \ldots, r_{1n};$
$r_{21}, r_{22}, \ldots, r_{2n};$
$\ldots, \ldots, \ldots, \ldots;$
$r_{m1}, r_{m2}, \ldots, r_{mn}]$ where $r_{ij}$ represents the membership of the i-th evaluation object to the j-th comment. The expert experience is converted into a weight vector w, and the comprehensive evaluation vector $B=w\odot R=[b_1, b_2, \ldots, b_m]$ is obtained through matrix multiplication; the leakage risk level is determined according to the maximum membership principle.

In a further embodiment, the step S42 further includes:

On the three-dimensional velocity distribution graph V (x, y, z), calculate the local mean graph Vmean and standard deviation graph Vstd of the velocity amplitude: Vstd: $\text{Vmean}(x, y, z)=1/(n^3)\Sigma_{i,j,k\in[-n/2, n/2]}V(x+i, y+j, z+k)$ $V_{std}(x, y, z)=\text{sqrt}(1/(n^3)\Sigma_{i,j,k\in[-n/2, n/2]}(V(x+i, y+j, z+k)-V_{mean}(x, y, z))^2)$, where n is the side length of the local cubic neighborhood.

Calculate the global velocity amplitude mean Vglob and standard deviation Vglobstd: $V_{glob}=1/(XYZ)\Sigma\Sigma\Sigma V(x, y, z)$ $V_{globstd}=\text{sqrt}(1/(XYZ)\Sigma\Sigma\Sigma(V(x, y, z)-V_{glob})^2)$, where X, Y, Z are the three-dimensional dimensions of the velocity field.

Adaptive threshold segmentation: extract suspected high-speed area H (x, y, z):

If $V(x, y, z)>\max(V_{mean}(x, y, z)+k1V_{std}(x, y, z), V_{glob}+k2V_{globstd})$, then H(x, y, z)=1, otherwise, H(x, y, z)=0;
where k1 and k2 are threshold coefficients, which can be set according to prior knowledge or optimized by trial and error. k1 controls the local threshold and k2 controls the global threshold.

Perform three-dimensional morphological processing on H to eliminate small noise areas and fill holes: H'=close (open (H));

Perform three-dimensional connected domain analysis on H', extract connected high-speed areas Ri, and calculate their volume Vi and aspect ratio $L_i/W_i$.

Set volume threshold Vmin and aspect ratio threshold rmax. Keep high-speed areas $R'_j$ that meet the conditions:

If $V_i>V_{min}$ and $L_i/W_i<r_{ma}$, then $R'_j=R_i$. A larger volume threshold can exclude small-scale high-speed structures caused by turbulence, and areas with aspect ratios close to 1 are more likely to be caused by leakage. Extract the centroid $C_j$, velocity mean $v_j$ and direction $d_j$ (main eigenvector) of $R'_j$ as suspected leakage points.

In this embodiment, the step S44 further includes:

With the suspected leakage point $C_j$ as the center, extract the local neighborhood block $B_j$ on the three-dimensional image data I(x, y, z), and the block size must cover the complete leakage channel.

Calculate the gray level co-occurrence matrix features (contrast, correlation, energy, entropy, etc.) of $B_j$, recorded as $f_{GLCM}$.

Binarize $B_j$ to get the leakage channel mask $M_j$:
If I(x, y, z)<Imin, or $\nabla^2 I(x, y, z)>g_{th}$, then $M_j(x, y, z)=0$;
Otherwise, $M_j(x, y, z)=1$.
where $I_{min}$ is the grayscale threshold, $\nabla^2$ is the Laplace operator, and gth is the edge threshold. The threshold can be adaptively determined based on the image histogram and prior knowledge.

Extract LBP (local binary pattern) features from $M_j$ to describe the texture pattern of the leakage channel:

$$LBP_{P,R}(x,y,z)=\Sigma_{p=0}^{P-1} s(g_p-g_c)2^p;$$

where P is the number of sampling points, R is the neighborhood radius, $g_c$ is the grayscale of the center pixel, and $g_p$ is the grayscale of the neighborhood sampling point.

$s(x)=1$ if $x>=0$, $s(x)=0$ if $x<0$;

Calculate the histogram $f_{LBP}$ of LBP features as the texture feature vector.

Perform three-dimensional refinement on $M_j$ and extract the skeleton line $S_j$ of the leakage channel.

Extract shape features from $S_j$, including skeleton line length $l_j$, average curvature $c_j$, average distortion $t_j$, etc., recorded as $f_{shape}$.

Combining multiple features to form the total morphological feature vector:

$$F_j=[f_{GLCM}, f_{LBP}, l_j/L_j, C_j, t_j];$$

where $L_j$ is the length of the leakage area $R'_j$, which is used to normalize the skeleton line length.

Perform cluster analysis (such as k-means) on $F_j$ of all training samples to obtain K leakage channel morphology categories.

Train SVM multi-classifiers with $F_j$ as input and leakage category as output to identify the channel morphology of unknown leakage points.

As shown in FIG. 6, the step S5 includes:

Step S51, calling a preconfigured three-dimensional culvert model;

Step S52, superimposing the three-dimensional fluid velocity distribution map and the leakage degree index on the three-dimensional culvert model, coloring the leakage points according to a hazard level, and superimposing a local particle velocity flow field to generate a three-dimensional leakage distribution heat map;

Step S53, extracting key leakage parameters, including position coordinates, leakage flow rate, change trend and hazard level, filling them in a preset report template, and forming a leakage detection report.

In this embodiment, on the culvert BIM model, the leakage area L is colored according to the hazard level to generate a three-dimensional leakage distribution heat map. Superimposing streamlines shows the local leakage flow field and intuitively shows the leakage situation. Extract key leakage parameters, including position coordinates, leakage flow rate, change trend, hazard level, automatically fill them in the preset report template, form a leakage detection report, and present the analysis results in the form of tables and charts. Compare the leakage hazard index with the preset warning value and danger value. If it exceeds the warning value, a yellow warning box will pop up on the monitoring interface with a voice prompt; if it exceeds the danger value, a red alarm box will pop up and the alarm will sound continuously, and the alarm information will be pushed to the operation and maintenance personnel's mobile phone. Encapsulate the original image data, leakage parameters, analysis reports, etc. in the standard format, add timestamps and store them in the planned distributed file system. Establish a health file for each culvert in the database to record the leakage detection data for subsequent big data analysis.

In actual scenarios, some difficulties were also found, including the chaotic particle motion caused by eddy currents and turbulence, the very messy velocity field, the random changes in the displacement vector direction, and the difficult in accurately estimating the real flow field. Multiple leakage points interfere with each other, and the local flow fields are superimposed together, making it difficult to distinguish the position and flow rate of a single leakage point. Uneven lighting in a small space and frequent screen jitter have a great impact on the particle image quality and registration accuracy.

To this end, the following embodiments are given:

According to one aspect of the present application, the step S31 also includes: designing a particle segmentation algorithm in combination with more features such as color, texture, optical flow, and then performing morphological filtering on the suspected particle area to remove pseudo particles. This solves the problem of easily introducing misjudgment when extracting particles based only on the size and shape similarity of the particles.

Specific details are as follows:

S311, perform color space conversion on the underwater image (for example, RGB to HSV), extract the components of saturation S and brightness V, and design an adaptive threshold segmentation algorithm to extract the suspected particle area:

If saturation $S(x, y) > S_{th}$ and $V_{min} <$ brightness $V(x, y) < V_{max}$, otherwise $(x, y) \in ROI$;

where $S_{th}$ is the saturation threshold, $V_{min}$ and $V_{max}$ are the upper and lower limits of brightness, and ROI is the region of interest. The threshold can be adaptively determined based on the image histogram.

S312, perform morphological processing on the preliminary segmentation results, first corroding and then dilating, to remove small noise areas: ROI'=Dilate (Erode (ROI));

S313, Extract the texture features of the area within ROI' based on the gray level co-occurrence matrix (GLCM), including contrast, correlation, energy, entropy, etc. Calculate the texture feature vector F=[Con, Cor, Asm, Ent] for each candidate area.

S314, Estimate the optical flow vector (u, v) of each candidate area to characterize the motion characteristics of the area. Classic optical flow algorithms such as Lucas-Kanade and Horn-Schunck can be used.

S315, Construct the particle feature vector $P=[S_{mean}, V_{mean}, A, C, F, u, v]$, where $S_{mean}$ and $V_{mean}$ are the mean saturation and brightness in the area, A is the area, C is the roundness, and (u, v) is the optical flow vector.

The feature vector of each candidate area is input into the SVM classifier to identify the true particle area.

According to one aspect of the present disclosure, the step S32 further includes the process of screening and optimizing particles with abnormal displacement vectors, including the following steps:

Step S321, for the particles with abnormal displacement vectors, obtaining the registered image frames, extracting an area where illumination change is greater than a threshold, and utilizing histogram equalization to enhance local details;

Step S322, predicting a movement trend of each particle through Kalman filtering, and searching and matching according to the predicted position, so that the particle link success rate is higher than a threshold;

Step S323, constructing at least two detection windows of different scales, and using each detection window to extract the particle displacement vector, and weightedly aggregating outputs of various windows based on an ensemble learning method;

Step S324, reinitializing the particles with abnormal displacement vectors and putting them into a global optimization process, and making the entire velocity field conform to a physical constraint to the greatest extent through iterative optimization.

In this embodiment, in the area where the illumination change is obvious, the image contrast is adaptively adjusted, and the local details are enhanced by histogram equalization to improve the particle recognition rate. The Kalman filter is introduced to predict the movement trend of each particle. Even if the image quality of a certain frame decreases and the particle is lost, the predicted position can be searched and matched to improve the particle link success rate. Design a multi-scale fusion strategy, extract particle displacement vectors with detection windows of different sizes, and then use ensemble learning methods (such as Stacking) to weightedly aggregate the outputs of different windows, which can capture large-scale structured flows without losing small-scale random velocity components. Reinitialize the particles with abnormal displacement vectors and put them into the global optimization process. Through iterative optimization, make the entire velocity field conform to physical constraints (such as velocity smoothness, continuity, etc.) to the greatest extent, and improve the overall estimation robustness.

Specifically, the particle tracking optimization process includes:

In the initial frame (t=1), extract the particle position $Z1=\{x_i, y_i | i=1, 2, \ldots, N\}$, where N is the number of particles. Initialize the Kalman filter of each particle, the state variables are position and velocity X=[x, y, u, v], and the observation variable is position Z=[x, y].

Predict the particle state distribution of the t-th frame $p(X_t | Z_{1:t-1}) = N(X_t; X'_t, P'_t)$;

where $X'_t = FX\{t-1\}$, $P'_t = FP\{t-1\}F' + Q$, F is the state transfer matrix, and Q is the process noise.

On the t-th frame image, search for the candidate particle position $Z_t = \{x_j, y_j | j=1, 2, \ldots, M\}$ with X't as the center, where M is the number of candidate particles. Calculate the Mahalanobis distance between the candidate particle and the state prediction value:

$$d_j=(Z_j-HX'_t)'S^{-1}(-HX'_t), S=HP'_tH'+R;$$

where H is the observation matrix and R is the observation noise.

Select the candidate particle $Z_t$ with the smallest distance as the observation value of the t-th frame, and use $Z_t$ to update the filter estimate:

$$K_t=P'_tH'(HP'_tH'+R)^{-1}; X_t=X'_t+K_t(Z_t-HX'_t);$$
$$P_t=(I-K_tH)P'_t;$$

If the distance between $Z_t$ and X't exceeds the threshold, it is judged as a particle loss, and the current particle position is extrapolated according to the position and velocity of the previous frame, and the process noise Q is increased.

$$\text{If } d_t > d_{th}, \text{then } Z_t=Z_{t-1}+X_{t-1}(3:4), Q=k*Q$$

Repeat the above steps until all frames are processed to obtain the motion trajectory of each particle $\{Z_1, Z_2, \ldots, Z_T\}$.

According to one aspect of the present disclosure, the step S33 also includes an adaptive grid division process, specifically comprising:

Step S331, calculating velocity changes of the particles according to the velocity vectors of the particles in the grid, recording them as velocity gradients, and obtaining an area where the velocity changes of the particles are greater than a threshold;

Step S332, adjusting dividing scale according to the velocity gradients, so that the velocity gradients are positively correlated with a grid resolution;

Step S333, for each grid block after division, counting the mean and variance of its internal velocity amplitude, direction, and further dividing the grid block with a variance greater than the threshold into multiple sub-blocks; after grid division, perform local smoothing inside each grid, and retaining a velocity jump at a grid boundary.

In this embodiment, SLIC superpixel segmentation is used, and the segmentation scale is adaptively adjusted according to the velocity gradient, and a higher grid resolution is automatically used in areas with drastic speed changes. For each grid block after segmentation, count the mean and variance of its internal velocity amplitude, direction, and further divide the grid block with a variance greater than the threshold into multiple sub-blocks. After adaptive meshing, local smoothing is performed inside each grid, while velocity jumps are retained at the grid boundaries. It can both smooth noise and retain fine structures. Subsequent leakage estimation, morphological analysis and other steps are similar to the previous ones, except that discretization calculations are performed under adaptive meshes, therefore they will not be repeated.

According to one aspect of the present disclosure, in the step S34, considering the effect of turbulent pulsation, the process of analyzing and correcting the velocity fields of the particles comprises:

Step S341, performing time averaging on at least three consecutive frames of particle images, to eliminate pulsating component, and obtaining a stable background velocity field;

Step S342, adopting a LES simulation method and a SGS stress model to perform a numerical solution on a pulsating flow field, to obtain a spatiotemporal distribution of turbulent pulsation velocity;

Step S343, compensating and correcting the original velocity field with analyzed average flow field and turbulent pulsation to restore true turbulent velocity vector distribution;

In this embodiment, it is assumed that the turbulent pulsating flow field u'(x, y, t) is separable from the average flow field U (x, y), that is: u (x, y, t)=U (x, y)+u'(x, y, t); where x, y are spatial coordinates, and t is time. Time averaging is performed on K consecutive frames of particle images to eliminate the pulsating component u' and obtain a stable background velocity field U. The large eddy simulation (LES) method is adopted, and the subgrid scale (SGS) stress model is introduced to numerically solve the pulsating flow field u' to obtain the spatiotemporal distribution of turbulent pulsating velocity. The original velocity field is compensated with the resolved average flow field U and turbulent pulsation u' to restore the true turbulent velocity vector distribution.

Specifically, the following steps are included:

Calculate the time-average flow field:

Assume that a total of K frames of particle images are collected in the time period T, and the instantaneous velocity field corresponding to each frame is u (x, y, $t_k$), where k=1, 2, ..., K, and $t_k$ is the acquisition time of the k-th frame.

The K frame velocity field is arithmetic averaged in the time dimension to obtain the time-averaged flow field U (x, y):

$$U(x,y)=(1/K)*\text{sum}_k=Ku(x,y,t_k);$$

According to the Reynolds decomposition principle, the instantaneous velocity field u can be decomposed into the time-averaged velocity U and the pulsating velocity u':

$$u(x,y,t)=U(x,y)+u'(x,y,t);$$

Substituting u into the above formula and let the time average of u' be zero, we can obtain:

$$(1/K)*\text{sum}_k=Ku'(x,y,t_k)=0;$$

that is, the time averaging operation can eliminate the pulsating component from the instantaneous velocity.

Using the LES Method to Solve the Turbulent Pulsating Velocity

The LES method directly solves the large-scale turbulent pulsation, and it uses the sub-grid scale model to describe the small-scale pulsation.

The instantaneous velocity field u (x, y, t) is low-pass filtered in space to obtain the filtered velocity field u~(x, y, t):

$$u\sim(x,y,t)=\int G(x-\xi,y-\eta)u(\xi,\eta,t)d\xi d\eta;$$

where G is the filter function, usually Gaussian filtering or Top-hat filtering.

The filtered velocity field u only contains large-scale (grid scale) turbulent pulsations, and small-scale (sub-grid scale) pulsations are filtered out. u satisfies the filtered N-S equation:

$$\partial u/\partial t+(u\cdot\nabla)u=-\nabla p/\rho+v\nabla^2 u-\nabla\tau;$$

where p is the filtered pressure, v is the dynamic viscosity, and τ is the SGS stress tensor.

The SGS stress tensor τ represents the influence of small-scale pulsations on large-scale motion, and a model is needed to close the equation. The most commonly used is the Smagorinsky model: $\tau=-2(C_s\Delta)^2|S|S\approx-2v_tS;$ where Δ is the grid scale, S is the strain rate tensor, Cs is the Smagorinsky constant (generally 0.1~0.2), and $v_t=(Cs\Delta)^2|S|$ is the turbulent viscosity.

Substitute τ into the filtered N-S equation to obtain the LES control equation: $\partial u\sim/\partial t+(u\sim\cdot\nabla)u\sim=-\nabla p\sim/\rho+\nabla\cdot[(v+v_t)\nabla u]$; numerically discretize and solve the LES equation in the solution domain to obtain the numerical solution of the large-scale velocity field $u\sim(x, y, tk)$ at discrete space-time points. Initial and boundary conditions are set according to the specific problem.

Subtract the filtered velocity u from the instantaneous velocity field u to obtain the small-scale (sub-grid scale, SGS) pulsation velocity u':

$$u'(x,y,t)\approx u(x,y,t)-u\sim(x,y,t);$$

S27. Superimpose the large-scale pulsation u and the small-scale pulsation u' to obtain the complete turbulent pulsation velocity field u'(x, y, t):

$$u'(x,y,t)=[u(x,y,t)-U(x,y)]+[u(x,y,t)-u\sim(x,y,t)];$$

So far, by time averaging the continuous K-frame particle images and solving the LES, the spatiotemporal distribution of the background velocity field U (x, y) and the turbulent pulsation velocity u'(x, y, t) can be obtained.

The LES method has achieved a good balance in engineering applications by directly solving the large-scale turbulent structure and modeling the small-scale turbulent effect. Compared with direct numerical simulation (DNS), LES greatly reduces the amount of calculation; compared with the Reynolds-averaged Navier-Stokes method (RANS), LES can capture the unsteady characteristics and coherent structures of turbulence.

In a further embodiment, the process of analyzing turbulent pulsation includes:

On the original image sequence, extract the flow field region of interest ROI, grid sample the pixel position (x, y) and gray value I(x, y) within the ROI, and obtain a three-dimensional data point cloud $\{x_i, y_i, I_i | i=1, 2, \ldots, K\}$.

Construct the LES control equation group:

$$\partial u/\partial t+(u\cdot\nabla)u=-\nabla p+\nabla\cdot[v(\nabla u+(\nabla u)^T)-\tau], \nabla\cdot u=0$$

where u is the velocity vector, p is the pressure, v is the dynamic viscosity, and τ is the sub-grid stress tensor.

τ uses the Smagorinsky-Lilly model: $\tau=-2(C_s\Delta)^2|S|(S-\frac{1}{3}tr(S)I)$, $S=0.5(\nabla u+(\nabla u)^T)$ where Δ is the filter scale, Cs is the Smagorinsky constant, S is the strain rate tensor, and I is the unit tensor.

The LES equations are numerically discretized. The time derivative uses the explicit Euler format, and the space derivative uses the second-order central difference.

$$u^{n+1}=u^n-\Delta t[(u^n\cdot\nabla)u^n+\nabla p^n-\nabla\cdot(v\nabla u^n)+\nabla\cdot\tau^n]; p^{n+1}=p^n-\rho(\nabla\cdot u^{n+1});$$

Given the initial and boundary conditions, the discrete equations are solved by the step-by-step projection method.

The intermediate velocity field u* at time $t^{n+1}$ is predicted by the velocity field $u^n$ at time $t^n$.

Use u* to solve the pressure Poisson equation and get the pressure field $p^{n+1}$ at time $t^{n+1}$.

Use $p^{n+1}$ to correct u* and get the velocity field $u^{n+1}$ at time $t^{n+1}$.

Repeat the above steps until the solution converges or the set number of time steps is reached. Extract the velocity pulsation u' corresponding to the large eddy structure and calculate the statistics such as the pulsation intensity and pulsation frequency of each point.

Superimpose the pulsation component u' on the average velocity field U to get the corrected velocity field V=U+u'.

According to one aspect of the present disclosure, the step S43 also includes a process of separating multiple leakage points, specifically:

Step S431, for the compensated and corrected velocity field, extracting an area where a local velocity vector direction gradient is greater than a certain threshold, and identifying it as a potential leakage area;

Step S432, for all suspected leakage areas preliminarily identified, performing a three-dimensional clustering based on a regional growing method, and merging the areas with spatial proximity and consistent velocity direction to form an independent leakage cluster;

Step S433, estimating flow rate and direction of each leakage cluster respectively, and replace leakage cross-sectional areas by a cross-sectional area of the leakage cluster; if an angle and a distance between two leakage clusters are both less than thresholds, merging them into one leakage point.

In this embodiment, on the corrected velocity field, extract the area where the local velocity vector direction gradient is greater than a certain threshold, and identify it as a potential leakage area. For all the suspected leakage areas initially identified, perform three-dimensional clustering based on the regional growing method, merge the areas that are spatially adjacent and have the same velocity direction, and form an independent leakage cluster. Estimate the flow rate $Q_i$ and direction $D_i$ of each leakage cluster $C_i$ (i=1, 2, …). In the calculation steps of $Q_i$, replace the leakage cross-sectional area A with the cross-sectional area of $C_i$. $D_i$ takes the weighted average direction of all velocity vectors in $C_i$. If the angle between two leakage clusters $C_i$ and $C_j$ is arccos $(D_i\cdot D_j)$<theta, and the distance meets min $(|x_i-x_j|, |y_i-y_j|, |z_i-z_j|)$<d, then they are merged into the same leakage point, and theta and d are preset thresholds. Iterate this process until all leakage clusters can no longer be merged.

In another embodiment of the present disclosure, S432 also includes the step of separating the incorrectly merged leakage points:

Perform three-dimensional threshold segmentation on the corrected velocity field V and extract the high-speed area $R_i$:

If $|V(x,y,z)|>v_{th}$, then (x, y, z)$\in R_i$, i=1, 2, … where $v_{th}$ is the velocity threshold, and $R_i$ is the i-th high-speed area.

For each high-speed area $R_i$, calculate its centroid position $C_i$ and use it as a suspected leakage point.

$$C_i=(\Sigma x_j/N_i, \Sigma y_j/N_i, \Sigma z_j/N_i), (X_j, t_j, z_j)\in R_i$$

where $N_i$ is the number of points in $R_i$.

Calculate the main direction $d_i$ of the high-speed area $R_i$, that is, the eigenvector corresponding to the maximum eigenvalue.

Calculate the average velocity amplitude $v_i$, average pressure $p_i$ (estimated by the Bernoulli equation) and volume flux qi in the high-speed area $R_i$.

Initialize the clustering set $S_0=\{R_1, R_2, \ldots, R_M\}$, M is the initial number of suspected leakage points.

For i, j$\in$[1, M], i≠j:

If $|C_i-C_j|<d_c$ and $\cos^{-1}(d_i\cdot d_j)<\theta_c$ 且 $|q_i-q_j|<e_q$, then merge $R_i$, $R_j$;

where $d_c$ is the distance threshold, $\theta_c$ is the angle threshold, and $e_q$ is the flow difference threshold.

Repeat the above steps until the clustering result no longer changes, and obtain K merged leakage point areas $L_1$, $L_2$, …, $L_K$.

For each $L_k$, take the point with the maximum internal velocity as the leakage core $C'_k$. Interpolate the velocity field in $L_k$ to $C'_k$ to estimate the leakage velocity $V_k$ and permeability coefficient $K_k$.

According to another aspect of the present disclosure, there is also provided an underwater detection system for contact leakage of a tunnel joint of a dam culvert, comprising:

at least one processor; and a memory connected to the at least one processor in communication, wherein the memory stores instructions executable by the processor, and the instructions are intended to be executed by the processor to implement the underwater detection method according to any one of the above embodiments.

It should be noted that the various specific technical features described in the above specific embodiments can be combined in any suitable way if there is no contradiction. In order to avoid unnecessary repetition, the present disclosure does not further describe various possible combinations.

What is claimed is:

1. An underwater detection method for contact leakage of a tunnel joint of a dam culvert, comprising:

Step S1, obtaining an underwater image sequence of the culvert by an underwater robot;

Step S2, preprocessing and registering the underwater image sequence;

Step S3, extracting particle information appearing in the underwater image sequence based on the registered underwater image sequence;

Step S4, constructing a three-dimensional fluid velocity distribution map based on the particle information, and determining leakage situation according to the three-dimensional fluid velocity distribution map; and Step S5, superimposing the three-dimensional fluid velocity distribution map on a preconfigured three-dimensional culvert model, and rendering and displaying it, wherein the Step S3 comprises:

Step S31, obtaining a registered image sequence, reading registered image frames one by one, identifying particle clusters of similar size and shape from the registered image frames as particles for velocity measurement;

Step S32, calculating an instantaneous velocity vector of each particle based on a mass center displacement of the particle between the registered image frames and a shooting interval of a camera;

Step S33, dividing the registered image frames into a predetermined number of grids, and counting mean and variance of the velocity vectors of the particles in each grid;

Step S34, adopting a fluid mechanics inversion algorithm, and considering particle characteristics and turbulent pulsation effects to correct velocity fields of the particles; and Step S35, retrieving internal and external parameters of the camera, converting the velocity fields of the particles from a pixel coordinate system to a world coordinate system, and obtaining the velocity fields of the particles in the world coordinate system, wherein the Step S4 comprises:

Step S41, obtaining velocity field data of the particles from at least 3 registered image frames, and superimposing them to obtain the three-dimensional fluid velocity distribution map;

Step S42, extracting an area where the velocity of the particles is greater than a preset threshold, from the three-dimensional fluid velocity distribution map, that is, a local high-speed area, and recording spatial coordinates, and seeking for a suspected leakage point based on the local high-speed area;

Step S43, estimating leakage flow rate and change trend according to a velocity distribution near the suspected leakage point;

Step S44, for each suspected leakage point, extracting an image near the suspected leakage point, extracting grayscale co-occurrence matrix features based on the image near the suspected leakage point, and obtaining morphological characteristics of a leakage channel; and Step S45, giving out a leakage degree index by comprehensively analyzing leakage position, flow rate and leakage channel morphology, in the Step S34, considering the effect of turbulent pulsation, the process of correcting the velocity fields of the particles comprises:

Step S341, performing time averaging on at least three consecutive frames of particle images, to eliminate pulsating component, and obtaining a stable background velocity field;

Step S342, adopting a LES simulation method and a SGS stress model to perform a numerical solution on a pulsating flow field, to obtain a spatiotemporal distribution of turbulent pulsation velocity;

Step S343, compensating and correcting the original velocity field with analyzed average flow field and turbulent pulsation to restore true turbulent velocity vector distribution;

wherein the Step S43 further comprises separating multiple leakage points, specifically comprising:

Step S431, for the compensated and corrected velocity field, extracting an area where a local velocity vector direction gradient is greater than a certain threshold, and identifying it as a potential leakage area;

Step S432, for all suspected leakage areas preliminarily identified, performing a three-dimensional clustering based on a regional growing method, and merging the areas with spatial proximity and consistent velocity direction to form an independent leakage cluster;

Step S433, estimating flow rate and direction of each leakage cluster respectively, and replace leakage cross-sectional areas by a cross-sectional area of the leakage cluster; if an angle and a distance between two leakage clusters are both less than thresholds, merging them into one leakage point.

2. The underwater detection method according to claim 1, wherein the Step S1 comprises:

Step S11, setting a movement trajectory of the underwater robot and moving the underwater robot to the culvert;

Step S12, configuring the camera provided on the underwater robot to shoot images at a predetermined rate, frame rate and resolution to obtain image frames, wherein a movement velocity matches with a shooting frame rate so that there is more than 30% overlap between adjacent frames;

Step S13, transmitting the collected image frames together with position and posture data of the underwater robot to a control system.

3. The underwater detection method according to claim 2, wherein the Step S2 comprises:

Step S21, sequentially obtaining the image frames, adopting a distortion correction model to correct radial distortion and tangential distortion, and obtaining corrected image frames;

Step S22, performing a local mean filtering on the corrected image frames to obtain filtered image frames;

Step S23, performing a logarithmic transformation on the filtered image frames to obtain transformed image frames;

Step S24, adopting ORB feature extraction and RANSAC algorithm to estimate a homography transformation matrix of two transformed image frames, and performing image registration based on the homography transformation matrix to obtain registered image frames, wherein the registered image frames form a registered image sequence.

4. The underwater detection method according to claim 3, wherein the Step S5 comprises:

Step S51, calling a preconfigured three-dimensional culvert model;

Step S52, superimposing the three-dimensional fluid velocity distribution map and the leakage degree index on the three-dimensional culvert model, coloring the leakage points according to a hazard level, and superimposing a local particle velocity flow field to generate a three-dimensional leakage distribution heat map;

Step S53, extracting key leakage parameters, including position coordinates, leakage flow rate, change trend and hazard level, filling them in a preset report template, and forming a leakage detection report.

5. The underwater detection method according to claim 4, wherein, the Step S32 further comprises screening and optimizing particles with abnormal displacement vectors, comprising:

Step S321, for the particles with abnormal displacement vectors, obtaining the registered image frames, extracting an area where illumination change is greater than a threshold, and utilizing histogram equalization to enhance local details;

Step S322, predicting a movement trend of each particle through Kalman filtering, and searching and matching according to the predicted position, so that the particle link success rate is higher than a threshold;

Step S323, constructing at least two detection windows of different scales, and using each detection window to extract the particle displacement vector, and weightedly aggregating outputs of various windows based on an ensemble learning method;

Step S324, reinitializing the particles with abnormal displacement vectors and putting them into a global optimization process, and making the entire velocity field conform to a physical constraint to the greatest extent through iterative optimization.

6. The underwater detection method according to claim 4, wherein, the Step S33 further comprises adaptive grid division, specifically comprising:

Step S331, calculating velocity changes of the particles according to the velocity vectors of the particles in the grid, recording them as velocity gradients, and obtaining an area where the velocity changes of the particles are greater than a threshold;

Step S332, adjusting dividing scale according to the velocity gradients, so that the velocity gradients are positively correlated with a grid resolution;

Step S333, for each grid block after division, counting the mean and variance of its internal velocity amplitude, direction, and further dividing the grid block with a variance greater than the threshold into multiple sub-blocks; after grid division, perform local smoothing inside each grid, and retaining a velocity jump at a grid boundary.

7. An underwater detection system for contact leakage of a tunnel joint of a dam culvert, comprising:

at least one processor, and a memory connected to the at least one processor in communication, wherein the memory stores instructions executable by the processor, and the instructions are intended to be executed by the processor to implement the underwater detection method according to claim 1.

* * * * *